(12) United States Patent
Takemura et al.

(10) Patent No.: US 7,647,127 B2
(45) Date of Patent: Jan. 12, 2010

(54) COMPONENT DATA MANAGING METHOD

(75) Inventors: Satoshi Takemura, Hamamatsu (JP);
Mitsutaka Gotoh, Hamamatsu (JP);
Makoto Hiroi, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 914 days.

(21) Appl. No.: 10/987,431

(22) Filed: Nov. 12, 2004

(65) Prior Publication Data
US 2005/0103188 A1 May 19, 2005

(30) Foreign Application Priority Data
Nov. 19, 2003 (JP) ............... 2003-389649

(51) Int. Cl.
*G06F 17/00* (2006.01)
(52) U.S. Cl. ........................ 700/94; 715/716
(58) Field of Classification Search ............... 700/94
See application file for complete search history.

(56) References Cited

U.S. PATENT DOCUMENTS

| | | | | |
|---|---|---|---|---|
| 5,471,239 A | * | 11/1995 | Hill et al. ............... | 348/155 |
| 5,524,060 A | * | 6/1996 | Silfvast et al. ............. | 381/104 |
| 5,877,971 A | * | 3/1999 | Eastty et al. ............. | 708/305 |
| 6,057,829 A | * | 5/2000 | Silfvast ................ | 345/156 |
| H001882 H | * | 10/2000 | Asthana et al. ............. | 370/503 |
| 6,327,631 B1 | * | 12/2001 | Eastty et al. ............. | 713/375 |
| 6,813,530 B1 | * | 11/2004 | Ives et al. ............... | 700/94 |
| 7,164,435 B2 | * | 1/2007 | Wang et al. ............. | 348/14.08 |
| 7,165,005 B2 | * | 1/2007 | Steger et al. ............. | 702/120 |
| 2002/0038308 A1 | * | 3/2002 | Cappi ................ | 707/104.1 |

OTHER PUBLICATIONS

Yamaha 02R96 manual: Copyright 2002.*
Digital Mixing Engine DME 32 Owner's Manual, Yamaha Corporation, 295 pages.
Digital Mixing Engine DME 32 Owner's Manual, Yamaha Corporation, 295 pages, c. 2000.

* cited by examiner

*Primary Examiner*—Curtis Kuntz
*Assistant Examiner*—Paul McCord
(74) *Attorney, Agent, or Firm*—Morrison & Foerster LLP

(57) ABSTRACT

As preset component data to perform processing on components for signal processing in a mixer engine, data for PC and data for transfer to be transferred to the mixer engine to cause the engine to perform signal processing are stored on the PC side, and data for engine is stored on the mixer engine side. When being directed to upgrade the preset component data on the mixer engine side, the PC compares the ID of each component included in the data for PC stored in the PC with the ID of each component included in the data for engine stored in the mixer engine, and, when detecting an ID existing only in the former, transfers the aforementioned data for transfer on the component corresponding to the ID to the mixer engine and causes the engine to store the data as the data for engine.

10 Claims, 6 Drawing Sheets

F I G. 6
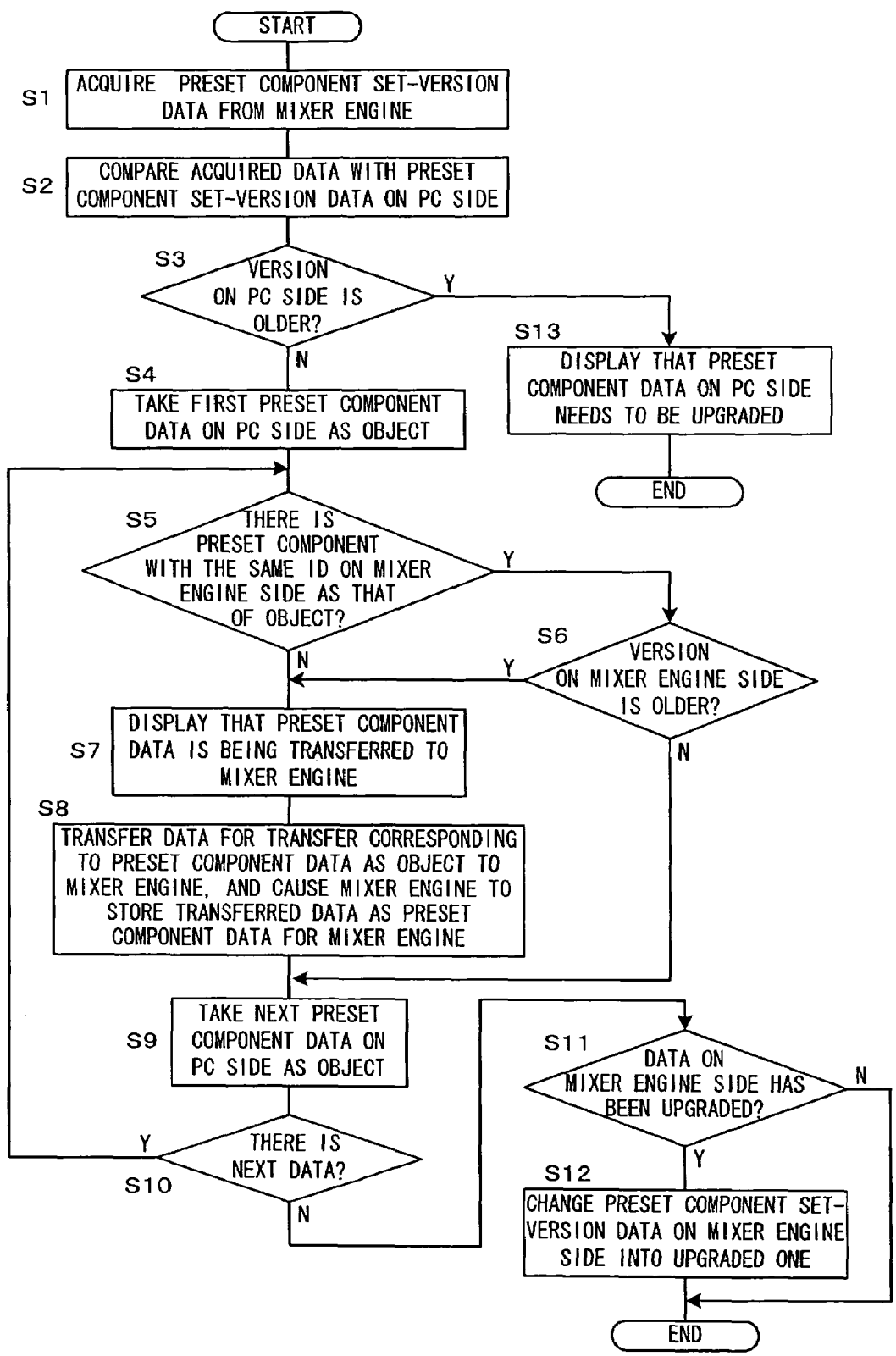

COMPONENT DATA MANAGING METHOD

BACKGROUND OF THE INVENTION

1. Field of the Invention

The invention relates to a component data managing method of managing data on components for signal processing used to edit the signal processing in an audio signal processing system in which an editing device edits contents of the signal processing in an audio signal processing device to cause the audio signal processing device to perform the signal processing according to the edited contents.

2. Description of the Related Art

Conventionally, there has been a well-known audio signal processing device in which an audio signal processing module is composed using a processor operable following a program, and an external computer such as a PC (personal computer) or the like functions as an editing device so that audio signals can be processed based on a configuration of signal processing edited using the editing device. Such an audio signal processing device is called a mixer engine in the present application. The mixer engine stores therein the configuration of signal processing edited by the PC and can independently perform processing on audio signals based on the stored configuration of signal processing.

For the edit of the configuration of signal processing on the editing device, the components being constituent elements for the signal processing in editing and a wiring status between their input and output nodes are graphically displayed on a display to allow users to perform editing work in an environment where the configuration of signal processing can be easily grasped visually. Then, a user can arrange desired processing components and set wires between the arranged components, thereby editing the configuration of signal processing.

The mixer engine and application software described above are described, for example, in Owner's Manual of a digital mixing engine "DME32 (trade name)" available from YAMAHA Co., especially pp. 23 to 66 (pp. 21 to 63 in English version).

SUMMARY OF THE INVENTION

When such an audio signal processing device is operated, data for conducting required control corresponding to each component is generally stored on the editing device side and the audio signal processing device side. Further, it is preferable to allow the data to be version-upgraded (including update) as necessary, so as to enable addition and change of components.

In a conventional editing device, however, the data for conducting control corresponding to each component is managed in accordance with the version of its application as a part of the application software. Also in a conventional audio signal processing device, the data is version-managed in accordance with the version of its firmware as a part of the firmware. Therefore, version upgrade of data for conducting control corresponding to the component is performed, in the editing device, through version upgrade of its application software for editing the configuration of signal processing, or in the audio signal processing device, through the version upgrade of its firmware.

Generally, version upgrade of the application software in any PC can be performed only by the PC main body, while upgrade of the firmware in an electronic device such as the audio signal processing device is performed by connecting a PC to the electronic device and then executing on the PC a version upgrade program for the electronic device. Since the firmware is several megabytes to several tens of megabytes in size, it takes several minutes to several tens of minutes to perform the version upgrade depending on the communication speed with the PC connected thereto, and additionally there is a risk of disconnecting during the upgrade operation, failing in version upgrade. Therefore, it has been demanded to avoid, if possible, version upgrade of the firmware only for the purpose of adding or upgrading components.

Further, in the above-described conventional case, when version upgrade is performed on the editing device side, the firmware on the audio signal processing device side needs to be version-upgraded in accordance therewith. This is because the audio signal processing device cannot normally perform the signal processing based on the edit result by the editing device unless the components included in the data on the editing device side match the components included in the data on the audio signal processing device side.

However, there is a troublesome problem in performance of version upgrade on the audio signal processing device side in accordance with and concurrently with the version upgrade on the editing device side. Especially for a user having a plurality of editing devices and a plurality of audio signal processing devices, management of version upgrade of those editing devices and audio signal processing devices is very troublesome.

The invention solves those problems, and its object is to make it possible, in an audio signal processing system in which an editing device edits contents of signal processing in an audio signal processing device and causes the audio signal processing device to perform the signal processing according to the edited contents, to easily perform a work of upgrading data on components for signal processing both on the editing device side and on the audio signal processing device side.

To achieve the above object, the invention provides a component data managing method of managing data on components for use in editing signal processing in an audio signal processing system, in which an editing device edits, in accordance with a direction accepted on a graphical screen, contents of signal processing which includes a plurality of components respectively having an input node and an output node, and wires connecting between the output nodes and the input nodes of the components, to be performed in an audio signal processing device, and causes the audio signal processing device to perform signal processing in accordance with the edited contents. Further, the method includes a step of causing the editing device to store, for each of the components, first component data for performing edit on the component in the edit of the signal processing using the graphical screen in the editing device, and second component data for causing the audio signal processing device to perform signal processing corresponding to the component. Further, the method also includes a step of causing the audio signal processing device to store, for each of the components, third component data for performing signal processing corresponding to the component in the signal processing, when the signal processing edited in the editing device is performed in the audio signal processing device. Further, the first and third component data associated with each of the components include identifiers corresponding to the component. Furthermore, the method also includes a step of causing the editing device, when being directed to upgrade the third component data, to execute a comparing step of comparing the identifier attached to the first component data stored in the editing device with the identifier attached to the third component data stored in the audio signal processing device; and an upgrading step of, when detecting an identifier attached only to the first component data in the comparing step, transferring the second component data on the component associated with the detected identifier to the audio signal processing device and causing the audio signal processing device to store the data as the third component data.

Further, the invention also provides another component data managing method of managing data on components for use in editing signal processing in an audio signal processing system, in which an editing device edits, in accordance with a direction accepted on a graphical screen, contents of signal processing which includes a plurality of components respectively having an input node and an output node, and wires connecting between the output nodes and the input nodes of the components, to be performed in an audio signal processing device, and causes the audio signal processing device to perform signal processing in accordance with the edited contents. Further, the method includes a step of causing the editing device to store, for each of the components, first component data for performing edit on the component in the edit of the signal processing using the graphical screen in the editing device, and second component data for causing the audio signal processing device to perform signal processing corresponding to the component. Further, the method also includes a step of causing the audio signal processing device to store, for each of the components, third component data for performing signal processing corresponding to the component in the signal processing, when the signal processing edited in the editing device is performed in the audio signal processing device. Further, the first and third component data associated with each of the components include identifiers and version data corresponding to the component. Furthermore, the method also includes a step of causing the editing device, when being directed to upgrade the third component data, to execute a comparing step of comparing the identifier and version data attached to the first component data stored in the editing device with the identifier and version data attached to the third component data stored in the audio signal processing device; and an upgrading step of, when finding a component having a common identifier but different version data attached to the first component data and the third component data in the comparing step, transferring the second component data on the component associated with the common identifier to the audio signal processing device and causing the audio signal processing device to store the data as the third component data.

In each of the above-described component data managing methods, it is preferable to provide steps of: causing the editing device and the audio signal processing device to respectively store set-version data being version data on the whole stored component data, and causing the editing device to compare the set-version data respectively stored in the editing device and the audio signal processing device, and, when the version of the component data stored in the audio signal processing device is newer, to stop control of the audio signal processing device and to prompt a user to upgrade the component data stored in the editing device.

Alternatively, it is preferable that the first component data includes data on a name and appearance of the component displayed on the graphical screen.

Alternatively, it is preferable that the second and third component data include: a microprogram for realizing signal processing corresponding to the component in a signal processing edited with the editing device and a digital signal processor included in the audio signal processing device executes; and composition data indicating a composition of parameters for use in the signal processing corresponding to the component.

Alternatively, it is also preferable that the editing device recognizes as being directed to upgrade the third component data when detecting start of connection with the audio signal processing device, when shifting to a state of performing online control on the audio signal processing device, or when being directed by a user to upgrade the third component data.

The above and other objects, features and advantages of the invention will be apparent from the following detailed description which is to be read in conjunction with the accompanying drawings.

BRIEF DESCRIPTION OF THE DRAWINGS

FIG. 6 is a flowchart showing consistency check and upgrade processing of preset component data executed by the PC shown in FIG. 1.

DETAILED DESCRIPTION OF THE PREFERRED EMBODIMENTS

Hereinafter, a preferred embodiment of the invention will be concretely described with reference to the drawings.

Figure 1:
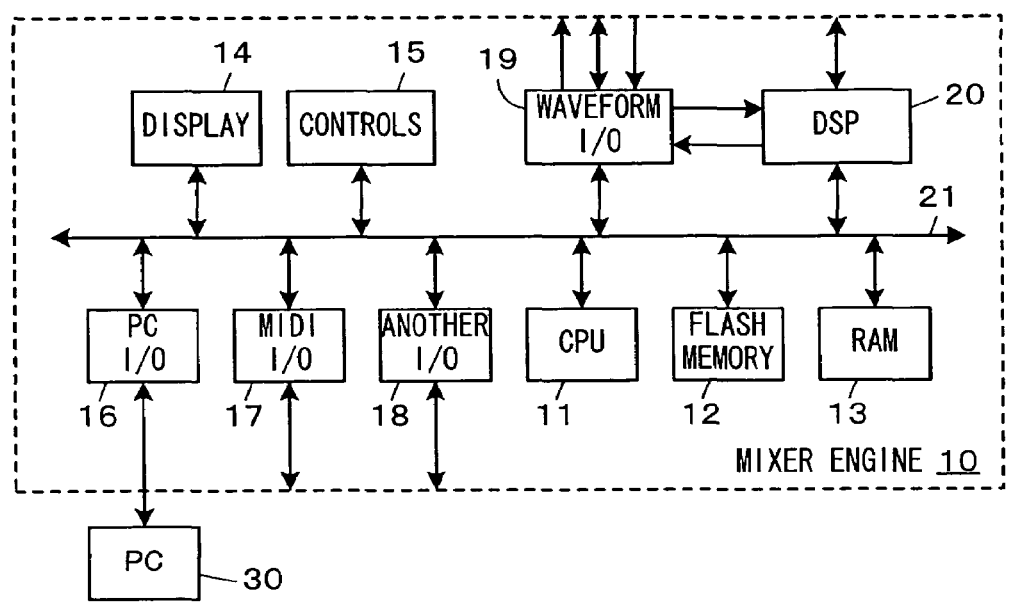
FIG. 1 is a block diagram showing a configuration of a mixer system to which a component data managing method of the invention is applied.

A configuration of a mixer system which comprises a PC being an editing device and a mixer engine being an audio signal processing device and to which a component data managing method of the invention is applied will first be described using FIG. 1. FIG. 1 is a block diagram showing the configuration of the mixer system.

As shown in FIG. 1, the mixer system comprises a mixer engine 10 and a PC 30. The PC 30 can employ, as hardware, a well-known PC having a CPU, a ROM, a RAM and so on and a display, that is, a PC on which an operating system (OS) such as Windows XP (registered trademark) runs. By executing a necessary edit program as an application program on the OS, the PC 30 can function as the editing device which edits a configuration of signal processing in the mixer engine 10, transfers the edit result to the mixer engine 10, and causes the mixer engine 10 to operate in accordance with the edited configuration of signal processing. The operation and function of the PC 30 described below should be realized by executing the edit program unless otherwise stated.

On the other hand, the mixer engine 10 includes a CPU 11, a flash memory 12, a RAM 13, a display 14, controls 15, a PC input and output module (I/O) 16, a MIDI (Musical Instruments Digital Interface) I/O 17, another I/O 18, a waveform I/O 19, and a digital signal processor (DSP) 20, which are connected by a system bus 21. The mixer engine 10 has functions of generating a microprogram for controlling the DSP 20 in accordance with the configuration of signal processing received from the PC 30, operating the DSP 20 in accordance with the microprogram to thereby perform various signal processing on inputted audio signals and output them.

The CPU 11, which is a controller that comprehensively controls operation of the mixer engine 10, executes a predetermined program stored in the flash memory 12 to thereby perform processing such as controlling communication at each of the I/Os 16 to 19 and display on the display 14, detecting operations at the controls 15 and changing values of parameters in accordance with the operations, and generating the microprogram for operating the DSP 20 from data on the configuration of signal processing received from the PC 30 and installing the program in the DSP 20.

The flash memory 12 is a rewritable non-volatile memory that stores a control program executed by the CPU 11, later-described preset component data and so on.

The RAM 13 is a memory that stores various kinds of data including later-described configuration data generated by converting the data on the configuration of signal processing received from the PC 30 into a required form and current data, and is used as a work memory by the CPU 11.

The display 14 is a display composed of a liquid crystal display (LCD) or the like. The display 14 displays a screen for indicating the current state of the mixer engine 10, a screen for referring to, modifying, saving, and so on of scenes being setting data contained in the configuration data, and so on.

The controls 15 are controls composed of keys, switches, rotary encoders, and so on, with which a user directly operates the mixer engine 10 to edit scenes and so on.

The PC I/O 16 is an interface for connecting the PC 30 thereto for communication, and capable of establishing communication via an interface of, for example, a USB (Universal Serial Bus) standard, an RS-232C standard, an IEEE (Institute of Electrical and Electronic Engineers) 1394 standard, an Ethernet (registered trademark) standard, or the like.

The MIDI I/O 17 is an interface for sending and receiving data in compliance with MIDI standard, and is used, for example, to communicate with an electronic musical instrument compatible with MIDI, a computer with an application program for outputting MIDI data, or the like.

The waveform I/O 19 is an interface for accepting input of audio signals to be processed in the DSP 20 and outputting processed audio signals. A plurality of A/D conversion boards each capable of analog input of four channels, D/A conversion boards each capable of analog output of four channels, and digital input and output boards each capable of digital input and output of eight channels, can be installed in combination as necessary into the waveform I/O 19, which actually inputs and outputs signals through the boards.

The another I/O 18 is an interface for connecting devices other than the above-described to perform input and output, and for example, interfaces for connecting an external display, a mouse, a keyboard for inputting characters, a control panel, and so on are provided.

The DSP 20 is a module which processes audio signals inputted from the waveform I/O 19 in accordance with the set microprogram and the current data determining its processing parameters. The DSP 20 may be constituted of one processor or a plurality of processors connected.

Figure 2:
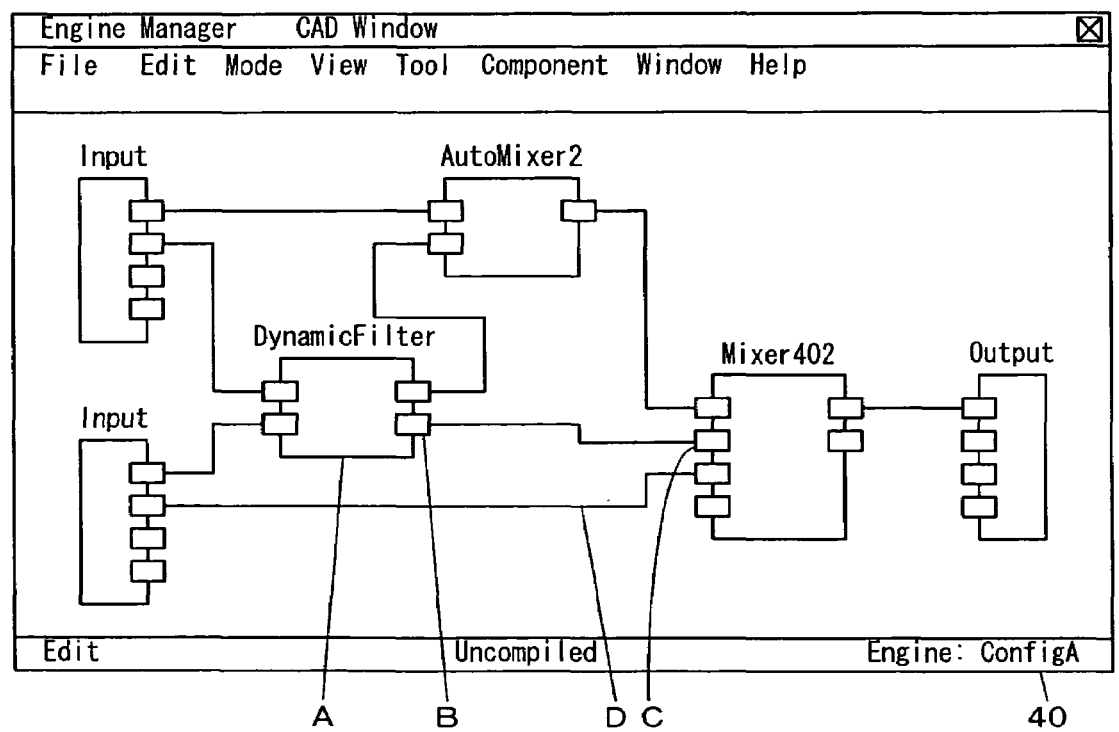
FIG. 2 is a diagram showing an example of an edit screen of a signal processing configuration displayed on a display of a PC shown in FIG. 1.

Next, an editing scheme of the configuration of signal processing in the PC 30 will be described. FIG. 2 is a diagram showing an example of an edit screen of a signal processing configuration displayed on the display of the PC 30.

When the user causes the PC 30 to execute the above-described edit program, the PC 30 causes the display to display a CAD (Computer Aided Design) screen as shown in FIG. 2 as a graphical screen (which is "window" in the figure) to accept an edit direction from the user. In this screen, the configuration of signal processing during the edit is graphically displayed by components (A) such as a DynamicFilter, an AutoMixer2, a Mixer402 and the like and wires (D) connecting output nodes (B) and input nodes (C) of the components. Note that the nodes displayed on the left side of the components are the input nodes, and the nodes displayed on the right side are the output nodes. The components which exhibit input to the mixer engine 10 have only the output nodes, the components which exhibit output from the mixer engine 10 have only the input nodes, and all the other components have both the input nodes and the output nodes.

In this screen, the user can select components desired to be added to the configuration of signal processing from a component list displayed by operation of a "Component" menu, arrange them on the screen, and designate wires between any of the output nodes and any of the input nodes of the plurality of components arranged, to thereby edit the configuration of signal processing. By directing execution of "Save" in a "File" menu, the edited result is saved as a configuration (config). Further, by directing execution of "Compile" in the "File" menu, the data format of a part of the configuration data can be converted into the data format for the mixer engine, and then the configuration data can be transferred to and stored in the mixer engine 10.

Note that, the PC 30 calculates during the edit the amount of resource required for the signal processing in accordance with the configuration of signal processing on the screen, so that if the amount exceeds that of the resource of the DSP 20 included in the mixer engine 10, the PC 30 informs the user that such processing cannot be performed.

Further, for each of the components included in the configuration of signal processing, a storage region for storing parameters (for example, the level of each input or the like if it is a mixer) of the component is prepared, when the component is newly disposed and compiled in the configuration of signal processing, in the current scene where the current data is stored, and predetermined initial values are given as the parameters.

Then, the user can edit the parameters stored in the parameter storage region by operating a parameter control panel provided for each component. Further, a plurality of resultant parameters edited here and stored in the current scene are stored in a scene memory in a configuration, as the scene being setting data on the configuration, so that the parameters can be arbitrarily recalled to the current scene when the mixer engine 10 performs signal processing in accordance with the configuration.

Further, the user can set either a non-online mode or an online mode as the operation mode of the mixer engine 10 and the PC 30. In the non-online mode, the mixer engine 10 and the PC 30 operate independently from each other, while, in the online mode, they operate maintaining mutual synchronization of parameters and so on in the current memory. They can shift to the online mode only when the configuration of signal processing of the mixer engine 10 matches the configuration of signal processing of the PC 30. In the online mode, the mixer engine 10 and the PC 30 are controlled (synchronized) such that their data of the current scenes become identical.

Further, when shifting to the online mode, the user can select either the current scene on the mixer engine 10 side or the current scene on the PC 30 side for use as the current scene after synchronization, and further direct that the contents stored in the scene memories should also be synchronized.

After shift to the online mode, the operation performed on the PC 30 side is immediately reflected on the operation of the mixer engine 10, while the operation performed on the control 15 of the mixer engine 10 is immediately reflected on the operation of the PC 30, whereby they are controlled so that the contents of the current scenes of both of them become identical. Note that it is also adoptable to automatically shift them to the online mode when the above-described "Compile" is executed, and to automatically shift them to the non-online mode when the configuration of signal processing on the PC 30 side is changed.

The configuration of data associated with the invention for use in the above-described mixer system will be described below.

Figure 3:
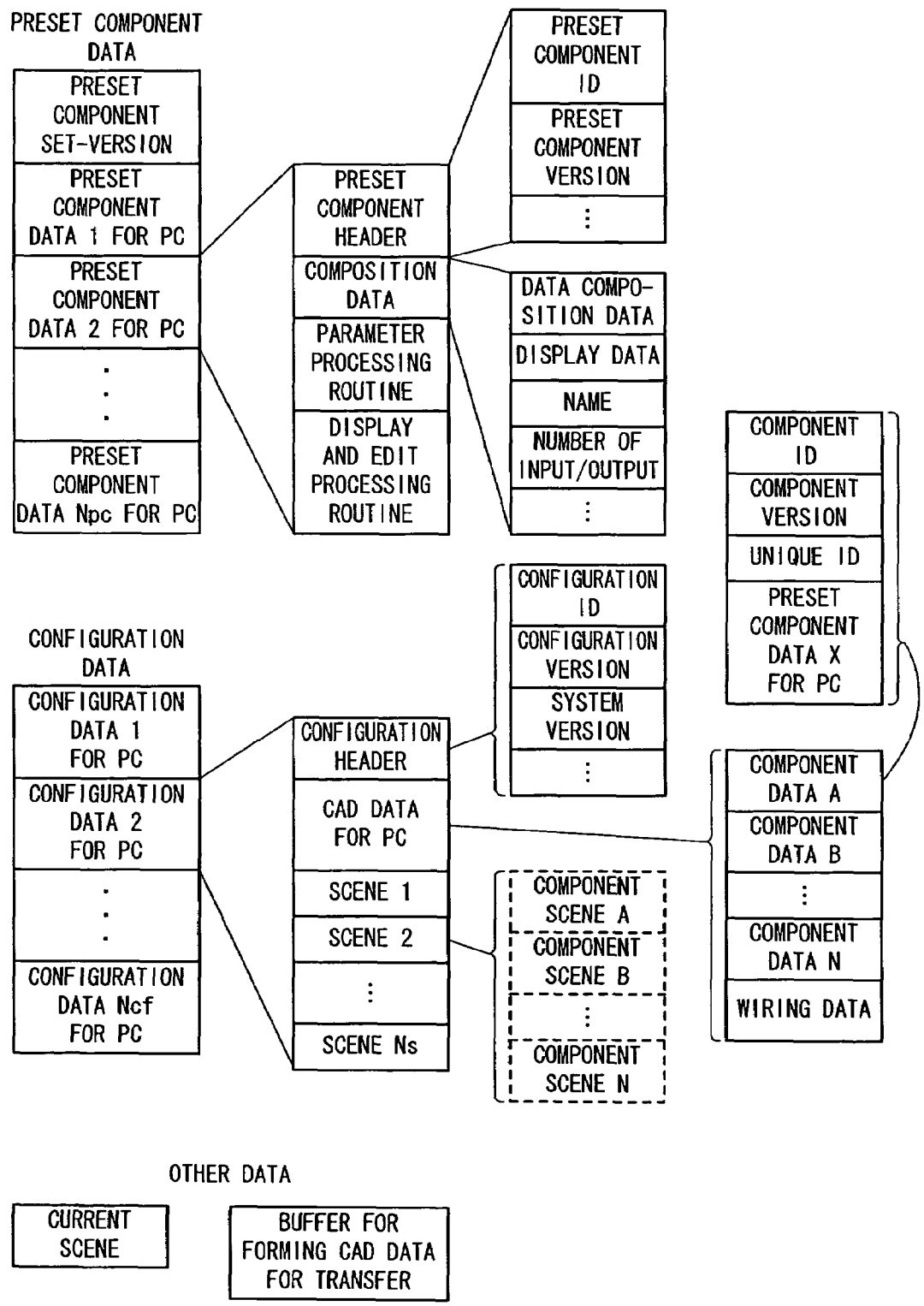
FIG. 3 is a diagram showing a configuration of data for use on the PC side of data relating to the invention.

First, the configuration of data for use on the PC 30 side will be shown in FIG. 3.

As shown in the drawing, when the above-described edit program is executed on the OS of the PC 30, the PC 30 stores preset component data and configuration data in a memory space defined by the edit program.

Of them, the preset component data is a set of data on components which can be used in editing signal processing and basically supplied from its manufacturer, although it may be configured to be customizable by the user. The preset component data includes data of preset component set-version data being version data for managing the version as the whole data set, and preset component data for PC prepared for each kind of the plurality of components constituting the data set.

Each preset component data for PC, which is data indicating the property and function of a component, includes: a preset component header for identifying the component; composition data showing the composition of the input and output of the component and data and parameters that the component handles; a parameter processing routine for performing processing of changing the value of the individual parameter of each component in each scene in the above-described current and scene memory in accordance with the numerical value input operation by the user; and a display and edit processing routine for converting the parameters of each component in the scenes into text data or a characteristic graph for display.

The preset component header includes data on a preset component ID indicating the kind of the preset component and a preset component version indicating its version, with which the preset component can be identified.

The above-described composition data also includes: the name of the component; display data for PC indicating the appearance such as color, shape, and so on of the component when the component itself is displayed in the edit screen, the design of the control panel displayed on the display for editing the parameters of that component, and the arrangement of the knobs and the characteristic graph on the control panel; and so on, as well as the input and output composition data indicating the composition of the input and output of the component, and the data composition data indicating the composition of data and parameters that the component handles.

Among the preset component data for PC, the display data for PC necessary for editing in the edit screen in graphic display in the composition data, the routine for displaying the characteristics in a graph form on the control panel in the display and edit processing routine, and so on, which are not required for the operation on the mixer engine 10 side, correspond to first component data. The other data added with the microprogram for causing the DSP 20 to operate as each component correspond to second component data.

On the other hand, the configuration data, which is data indicting the configuration of signal processing that the user edits, is saved when the user selects save of the edit result, in such a manner that the configuration of signal processing, the setting values and so on at that point in time are saved as one set of configuration data for PC. Each configuration data for PC includes: a configuration header for identifying the configuration data; CAD data for PC indicating the contents of the edited configuration of signal processing; and scenes being the above-described setting data.

Among these, the configuration header includes data such as a configuration ID uniquely assigned when the configuration is newly saved, a configuration version indicating a modified version by changing when the configuration data is modified, a system version indicating the version of the edit program with which the configuration data is created, and so on.

Besides, the CAD data for PC includes component data on each component included in the edited configuration of signal processing and wiring data indicating the wiring status between the components. Note that if a plurality of preset components of the same kind are included in the configuration of signal processing, discrete component data is prepared for each of them.

Each component data includes: a component ID indicating what preset component that component corresponds to; a component version indicating what version of preset component that component corresponds to; a unique ID being an ID uniquely assigned to that component in the configuration of signal processing in which that component is included; property data including the setting value of adjusted delay time on each input node that is the delay time to be given to a signal inputted to the input node of that component; and display data for PC indicating the position where the corresponding component is arranged in the edit screen on the PC 30 side and so on.

Besides, the wiring data includes, for each wiring of a plurality of wirings included in the edited configuration of signal processing: connection data indicating what output node of what component is being wired to what input node of what component; and display data for PC indicating the shape and arrangement of that wiring in the edit screen on the PC 30 side.

Besides, each scene in the scene memory is an aggregation of component scenes being parameters on each component of the configuration of signal processing, and the format and array of data in each component scene are defined by the data composition data in the preset component data for PC of the preset component which is identified by the component ID and the component version of that component included in the CAD data for PC.

The above are main data for use on the PC 30 side, and these data may be stored in a non-volatile memory such as an HDD (hard disk drive) or the like and read out into the RAM for use when required.

In addition to the above data, the PC 30 also stores the current scene being the setting data which is currently effective in the currently effective configuration. The data of the current scene has the same configuration as that of each scene in the above-described scene memory, so that when the parameters of one component in the configuration of signal processing are edited on the control panel or the like, the edit is performed by modifying the parameters of that component in the current scene and the result can be saved in the scene memory as one scene.

Further, in the PC 30, a buffer for forming, from the CAD data for PC, CAD data for transfer to engine when transferring the configuration data to the mixer engine 10 in the above-described "Compile" processing is provided. Note that the CAD data for transfer to engine is created by deleting from the CAD data for PC the data not in use on the mixer engine 10 side such as the above-described display data for PC on the component and wiring and further cutting off a portion not in use between the data for packing.

Figure 4:
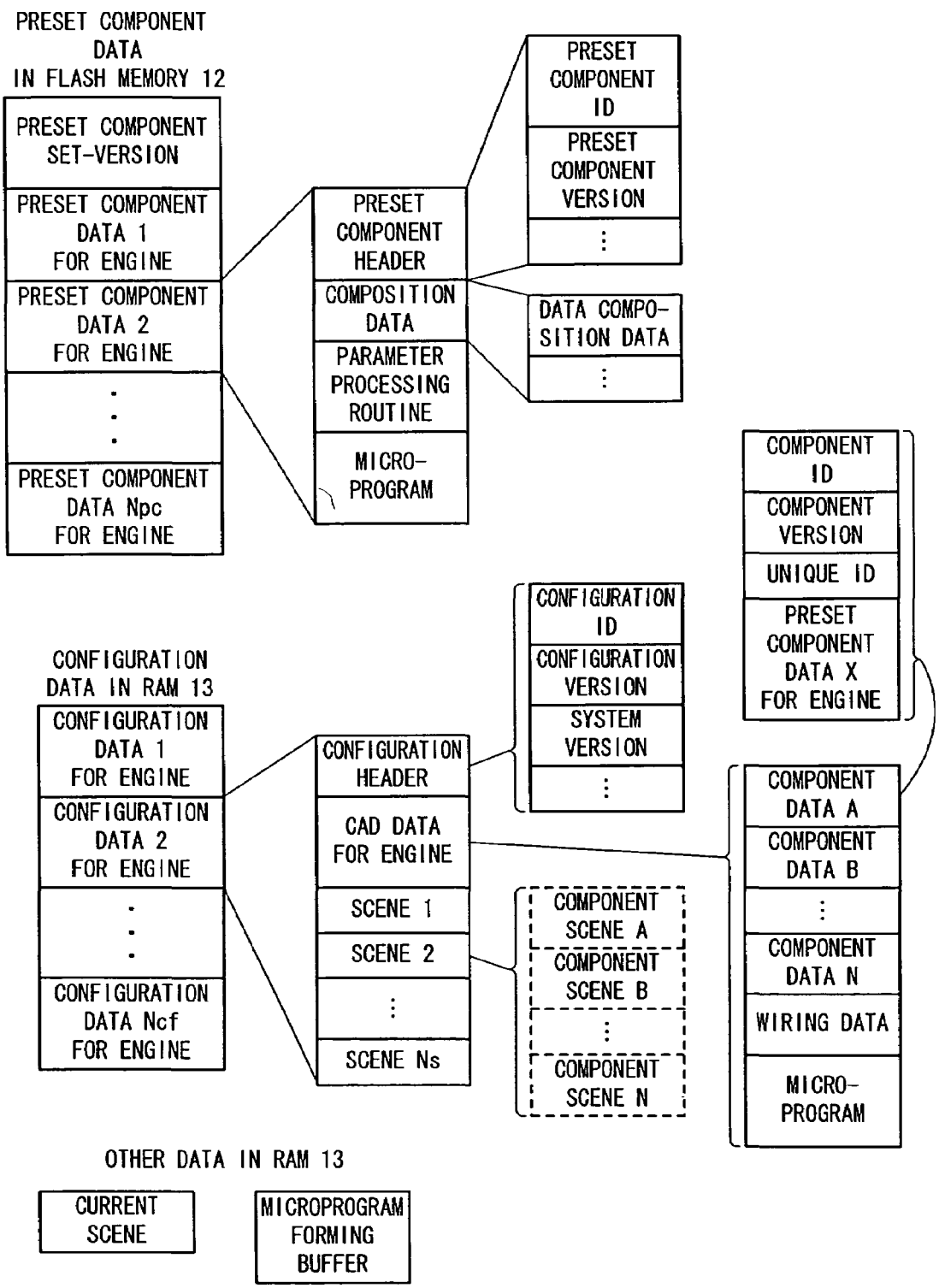
FIG. 4 is a similar diagram showing a configuration of data for use on a mixer engine side.

Next, the configuration of data to be stored on the mixer engine 10 side will be shown in FIG. 4.

As shown in the drawing, on the mixer engine 10 side, preset component data and configuration data are also stored as primary data. Incidentally, the preset component data is stored in the flash memory 12 and the configuration data in the RAM 13, their configuration contents being slightly different from those on the PC 30 side. Hence, points different from the data to be stored on the PC 30 side will be mainly described.

As shown in FIG. 4, the preset component data on the mixer engine 10 side includes preset component data for engine. The preset component data for engine is third component data for causing the mixer engine 10 to perform audio signal processing on each component, and is firstly different from the preset component data for PC in that it includes the microprogram for operating the DSP 20 to function as that component, in place of a part of the display and edit routine.

Further, since edit of the configuration of signal processing and display of the characteristic graph of the parameter are not performed on the mixer engine 10 side, the display data for PC included in the composition data for the PC and a part of routine such as a routine of displaying the characteristic graph of the display and edit routine for PC, are not included. Note that also on the mixer engine 10 side, the setting values of parameters can be displayed on the display 14 and edited by the control 15. Therefore, the routine for converting the values of the parameters into text data for display of the display and edit routine for PC is required and included in the parameter processing routine.

The preset component data is the same as that on the PC 30 side in points other than the above, so that the same ID and version as those of the corresponding sets and components on the PC 30 side are used to enable recognition of the correspondence therebetween.

Secondly, as for the configuration data, the configuration data for engine is different from that for PC 30 in that it includes CAD data for engine in place of the CAD data for PC. Here, the CAD data for engine is the CAD data for transfer to engine received from the PC 30 and stored, which is created by deleting the display data for PC from the CAD data for PC and packing as described above.

The configuration data is the same as that on the PC 30 side in points other than the above, so that the same ID and version as those of the corresponding configurations and components on the PC 30 side are used to enable recognition of the correspondence therebetween.

Note that the mixer engine 10 is for processing audio signals based on the configuration of signal processing edited on the PC 30. Accordingly, the CPU 11 forms the microprogram which the DSP 20 executes, based on the CAD data for engine received from the PC 30, and thus has a microprogram forming buffer prepared as a work area for the formation.

In microprogram forming processing, the above-described microprogram is sequentially read out from the preset component data specified by the component ID and the component version of each component included in the CAD data for engine; assignment of resources such as an input/output register, a delay memory, a store register, and so on which are required for operation of each component is performed; and the microprogram is processed based on the assigned resources and then written into the microprogram forming buffer.

In this event, a resource for delay is also assigned to each component in accordance with the setting of adjusted delay time included in the CAD data for engine, and a delay program according to the setting of the adjusted delay time of each input node is added to the microprogram. Based on the wiring data included in the CAD data for engine, a program for passing data between the input/output registers corresponding to the input and output nodes of each component is further written into the microprogram forming buffer, thereby completing the microprogram to be given to the DSP 20.

The reason why the microprogram is processed based on the resource assignment here is to correspond it to the architecture of the DSP 20 included in the mixer engine 10. Therefore, for another architecture, a parameter corresponding to the assigned resource, for example, may need to be set in the DSP 20 in place of processing the microprogram itself.

The second component data transferred from the PC 30 to the mixer engine 10 for causing the mixer engine 10 to perform signal processing corresponding to that component, that is, data corresponding to the preset component data for engine shown in FIG. 4 may be stored on the PC 30 side as independent data separate from the preset component data for PC, or stored in the preset component data for PC as a part of each component. In the latter case, when the second component data is transferred to the mixer engine, the second component data is created by cutting off unnecessary data from the preset component data for PC. In this case, it is also possible to design such that the second component data is transferred without cutting off the unnecessary data, but such a design is less desirable because of limited capacity of the flash memory of the mixer engine 10 which stores the data.

Figure 5:
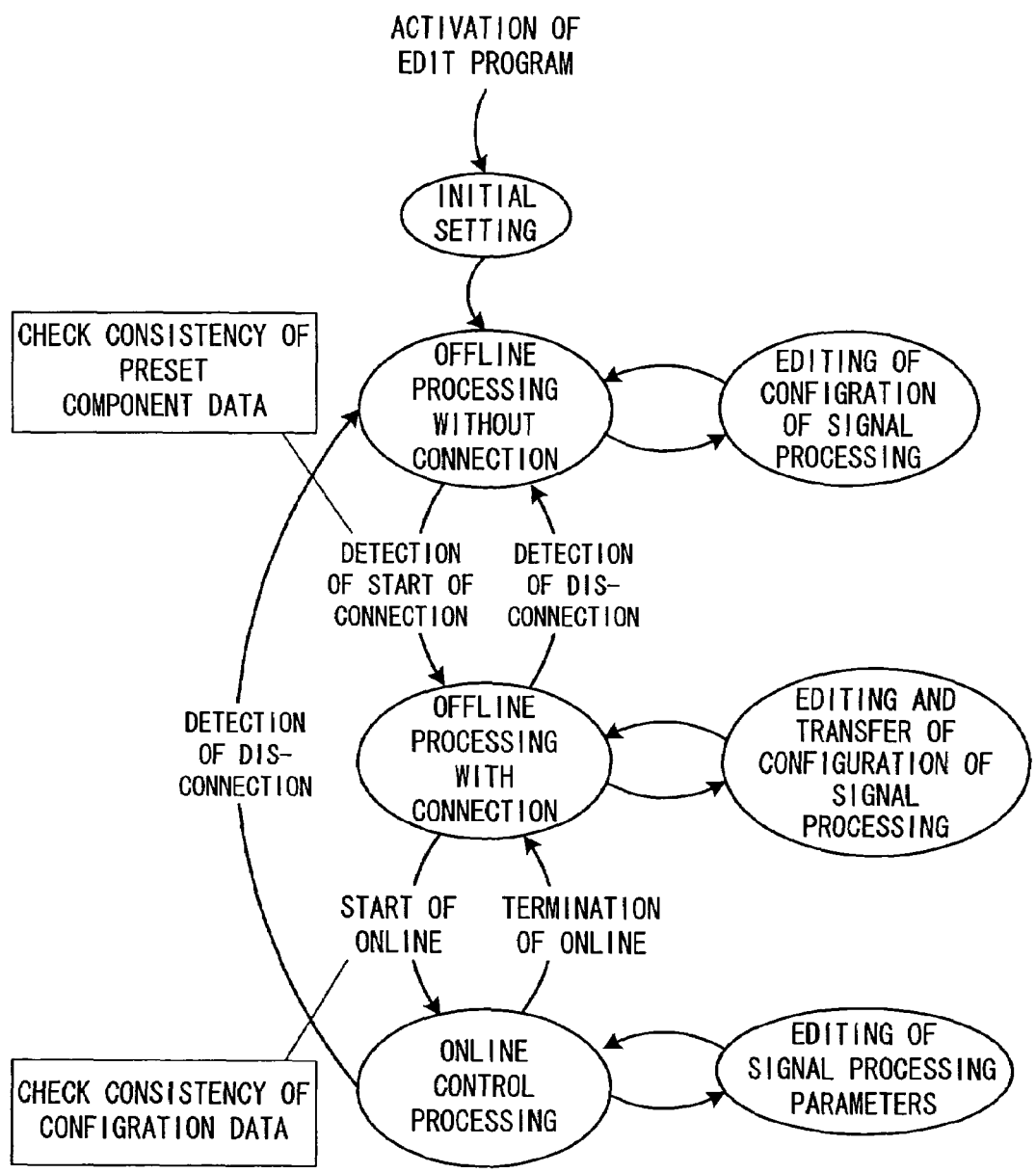
FIG. 5 is a state transition diagram showing the outline of transition of an operation state of the PC in the mixer system shown in FIG. 1.

Next, transition of operation state in the mixer system shown in FIG. 1 will be described using FIG. 5. FIG. 5 is a state transition diagram showing the outline of transition of the operation state of the PC in the mixer system.

As illustrated in the drawing, upon activation of the above-described edit program, the PC 30 firstly performs initial setting for functioning as the editing device, and secondly shifts into the offline processing state (the non-online mode) in which the PC 30 is not connected to the mixer engine 10. In this state, the connection with the mixer engine 10 has not been detected yet, in which state the PC 30 periodically checks the interface on the PC 30 side for connection of the mixer engine 10 thereto. In this state, the user can edit the configuration of signal processing in the edit screen as shown in FIG. 2, but cannot transfer the edited configuration of signal processing to the mixer engine 10.

Then, upon detection of start of the connection with the mixer engine 10 from this state, the PC 30 shifts to the offline processing state with connection, in which state the user can edit the configuration of signal processing and additionally transfer the edited configuration of signal processing to the mixer engine 10 as the configuration. The case in which the start of connection is detected here refers to, for example, a case in which the PC 30 and the mixer engine 10 in operation are physically connected during operation of the edit program, a case in which the power of the mixer engine 10 physically connected to the PC 30 is turned on during operation of the edit program, and a case in which the edit program is activated on the PC 30 physically connected to the mixer engine 10 in operation.

When shifting to the offline processing state with connection, the PC 30 compares the IDs and version data on the preset component data stored on the PC 30 side with those stored on the mixer engine 10 side to check their consistency, so that when they are not consistent with each other, the PC 30 performs upgrade processing.

Further, in the offline processing state with connection, the user can direct the PC 30 to shift to the online control processing state (the online mode). In response to this direction, whether or not the configuration data and so on of the PC 30 are consistent with those of the mixer engine 10 is checked, and then the PC 30 can shift to the online control processing state only when they are consistent with each other. If they are not consistent with each other, the PC 30 warns the user of the fact and does not shift to the online processing. Note that it is also adoptable that even if they are inconsistent, the user specifies the direction of copy to transfer the inconsistent data between the PC 30 and the mixer engine 10 so as to ensure consistency and then to allow the PC 30 to shift to the online control processing state.

The check of the configuration data and so on is performed to check whether or not the configurations of signal processing of the PC 30 and the mixer engine 10 match each other, and it is only required at least that the CAD data included in the currently selected configuration data and the current scene being its operation parameters of the PC 30 are consistent with those of the mixer engine 10.

To compare the CAD data and the current scene of the PC 30 with those of the mixer engine 10 here, it is necessary that the preset components of the PC 30 are consistent with those of the mixer engine 10 as a premise. On the CAD data, the state in which the CAD data for PC and the CAD data for engine indicate the same configuration of signal processing is referred to as being consistent, while on the current scene and each scene in the scene memory, the state in which all the operation parameters of the scene of the PC 30 and the mixer engine 10 match each other is referred to as being consistent.

When their CAD data and current scenes are consistent with each other, edit of the parameters on the control panel can be performed still in the online control processing state. Further, when it is desired to perform scene recall still in the online control processing state, it is only required to make the whole configuration data currently selected and the current scene of the PC 30 consistent with those of the mixer engine 10 in the consistency check of the configuration data. Further, when it is desired to enable switching of the configuration data, it is only required to make all of the configuration data 1 to Ncf and the current scene of the PC 30 consistent with those of the mixer engine 10, shown in FIG. 3 and FIG. 4 respectively.

The user is inhibited from modifying the configuration of signal processing in the online control processing state because editing the configuration of signal processing in the CAD screen causes a loss of the consistency of the configuration data. The mixer engine 10 processes signals using the parameters of the current scene based on the configuration data whose consistency with the configuration data selected on the PC 30 has been verified, and can edit the parameters of the current scene on the control panel during execution of the signal processing.

When directed to terminate the online control in the online control processing state, the PC 30 shifts to the offline state with connection. When termination of connection, that is, disconnection is detected in the online control processing state or the offline processing state with connection, the PC 30 shifts to the offline processing state without connection.

The PC 30 edits the configuration of signal processing that the mixer engine 10 executes, in accordance with the direction from the user, and performs control of the operation and so on of the mixer engine 10 based on the configuration of signal processing, while shifting in state as described above during execution of the edit program.

Next, consistency check and upgrade processing of the preset component data in the above-described PC 30 will be described. A flowchart of this processing is shown in FIG. 6.

In the mixer system shown in FIG. 1, when a preset component is newly developed or improved, the manufacturer can provide the change in the form of version upgrade of the edit program. In this situation, the edit program after the version upgrade includes preset component data for PC and that for engine including data on the newly developed or improved preset component. When this is installed into the PC 30, these data are stored in the PC 30.

In execution of the edit program by the PC 30 in this state, when directed to upgrade the preset component data in the mixer engine 10, the PC 30 carries out consistency check and upgrade of the preset component data by performing the processing shown in the flowchart in FIG. 6. For example, when the PC 30 detects the start of connection with the mixer engine 10, the PC 30 preferably recognizes the detection as being directed to perform the above-described upgrade and starts the processing.

In this processing, first in Step S1 and Step S2, the version data on the preset component set on the PC 30 side is compared with that on the mixer engine 10 side, and if the version on the PC 30 side is older, the flow proceeds from Step S3 to Step S13, in which such a display that the preset component data (or the edit program including the data) on the PC 30 side needs to be upgraded is displayed on the display to thereby prompt the user to upgrade it. This is because, in this mixer system, normal control of the mixer engine 10 cannot be performed unless the components included in the preset component data on the PC 30 side match those on the mixer engine 10 side, but the edit program on the PC 30 side can be relatively easily version-upgraded.

Incidentally, this situation rarely happens because the preset component data on the mixer engine 10 side is upgraded by transmitting new data from the PC 30 which has the edit program version-upgraded. However, such a situation may happen when, for example, a plurality of PCs 30 are provided, one of them which has the version-upgraded edit program is connected to the mixer engine 10, and thereafter another PC 30 which has not been version-upgraded yet is connected.

On the other hand, if the version on the PC 30 side is not older, the flow proceeds from Step S3 to Step S4 and thereafter. Taking the preset component data on the PC side as an object in sequence in the processing up to Step S10, when there is no preset component data with the same ID on the mixer engine side as that of the object (S5), or when there is preset component data with the same ID as that of the object but the version on the mixer engine side is older (S6), the preset component data corresponding to the ID is upgraded. Then, this upgrade is performed by transferring the preset component data for transfer stored in the PC 30 to the mixer engine 10, and causing the mixer engine to store the data in the flash memory 12 as the preset component data for engine, while displaying on the display that data is being transferred (S7 and S8).

After completion of the above-described processing on all of the preset component data on the PC side, the preset component data which need to be upgraded are all upgraded, and then the flow proceeds to Step S11 and thereafter, in which when upgrade has been performed, the version data on the preset component set on the mixer engine 10 side is changed into upgraded one, and the processing ends. If the upgrade has been already carried out and thus the data on the PC 30 side is consistent with that on the mixer engine 10 side, there is no need to upgrade the data again and thus the processing is ended as it is.

In the above-described processing, the processing in Steps S5 and S6 is processing of comparison step, and the processing in Steps S7 and S8 is processing of upgrade step.

By causing the PC 30 to execute the above-described processing, the edit program is version-upgraded, so that even when a component is newly developed or improved, the data on the component on the mixer engine 10 side can also be automatically upgraded only by installing the component once on the PC 30 side, and then activating the PC 30 and connecting it to the mixer engine 10. Accordingly, upgrade work for the whole mixer system can be easily carried out.

Further, for newly developed or improved components, the preset component data can be replaced with new one for every component. The reason why this replacement is made possible is that the preset component data is formed to be data composed of the header, the composition data, the processing routine and program for each preset component as shown in FIG. 3 and FIG. 4 so as to increase the uniqueness of each preset component data, and that the component ID and the conversion data are assigned to each preset component data so that the version can be managed for each preset component.

Note that, in the processing shown in FIG. 6, the processing in Step S5 is processing of coping with upgrade when a component is added, and the processing in Step S6 is processing of coping with upgrade when a component is improved (version-upgraded), and therefore performance of both of them is not essential.

Further, the judgment in Step S3 may be performed by comparison of the ID and version of each preset component rather than by comparison of the version data on the component set. In such a case, if there is a preset component having the same ID and an older version on the PC 30 side, or if there is a preset component which exists on the mixer engine 10 side but does not exist on the PC 30 side, the judgment in Step S3 is YES.

In addition to or in place of the start of connection to the mixer engine 10, even the timing of shift to the online control processing state, any timing directed by the user, and so on, the PC 30 may recognize as being directed to upgrade the preset component data in the mixer engine 10, and properly perform above-described consistency check of the preset component data and upgrade of the preset data subsequent thereto when the PC 30 judges it is necessary.

Further, although the example in which the change in the preset component is only in a version upgrade direction is described here, it is also adoptable to allow a change in a version downgrade direction for the purpose of reproducing the data created in the past, and so on. However, even in that case, it is preferable to configure that the normal change is performed only in the version upgrade direction, and the change in the version downgrade is made possible only when the user specifically orders version downgrade.

Furthermore, although the example in which upgrade is carried out without exception when a component is added or improved is shown in FIG. 6, it is also adoptable to display a dialog box on the display prior to the upgrade to ask the user whether the upgrade is necessary or not.

In such a configuration, it is preferable that the component which the user has chosen not to upgrade is not upgraded without asking the user again even if inconsistency is detected in the next processing and thereafter.

Further, it is also adoptable that the component which was chosen not to upgrade in the past can also be arbitrarily selected and upgraded under the user's direction.

Further, it is also adoptable to divide the components into essential ones and inessential ones, so that the data on the inessential components can be deleted from the mixer engine and the PC. In this case, it is preferable not to perform upgrade nor give warning even if inconsistency is detected on the deleted components.

Figure 7:
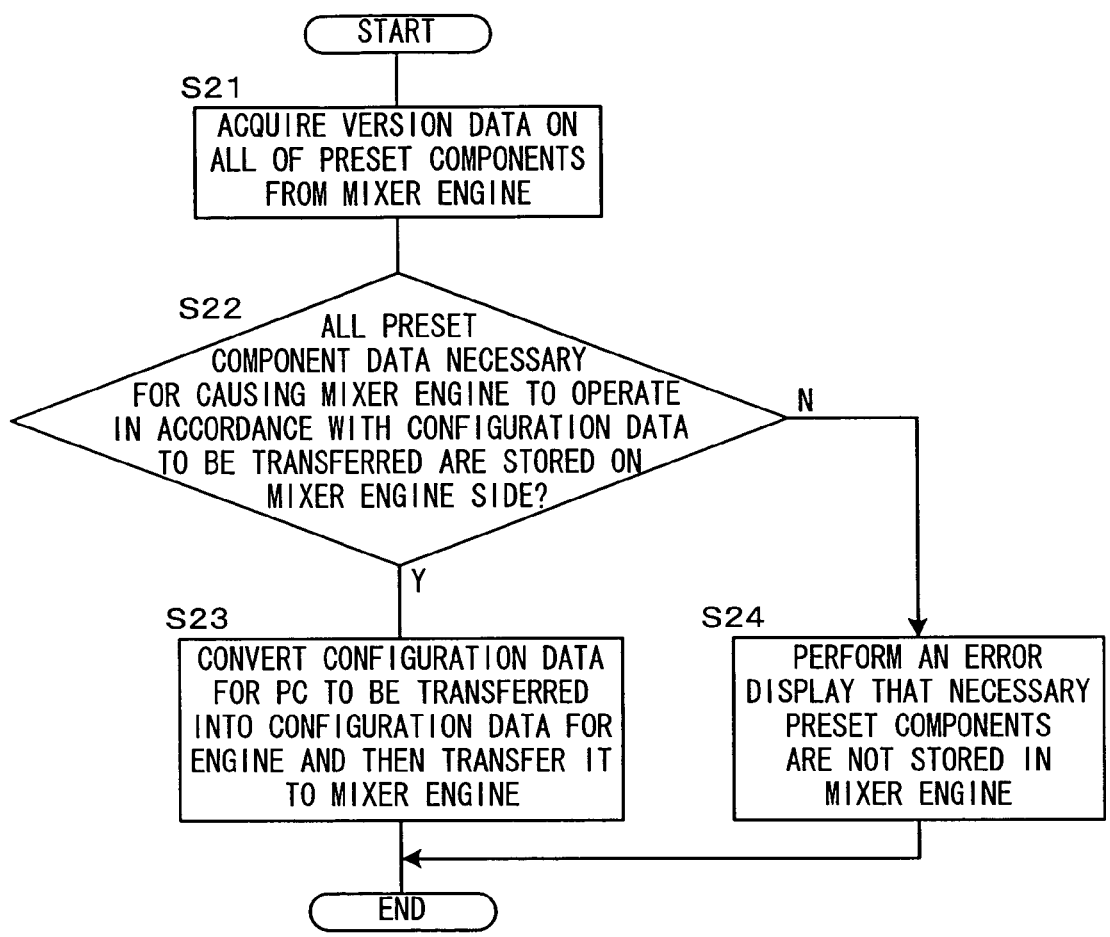
FIG. 7 is a flowchart showing processing executed by the PC shown in FIG. 1 when transferring the configuration from the PC to the mixer engine in a modified example of the embodiment of the invention.

Incidentally, when the choice not to perform upgrade even if the inconsistency is detected is made possible as described above, an inconvenience may occur in the operation of the mixer engine 10. Hence, it is preferable to cause the PC 30 to execute the processing shown in the flowchart of FIG. 7 when transferring the configuration from the PC 30 to the mixer engine 10.

In this processing, the PC 30 judges whether or not all the preset component data necessary for causing the mixer engine to operate in accordance with the configuration data to be transferred are stored on the mixer engine 10 side (S22), and if they are stored, the PC 30 converts the configuration data for PC on the PC 30 side into the configuration data for engine to be stored in the mixer engine 10, and then transfers the data to the mixer engine 10 (S23). On the other hand, if they are not stored, the PC 30 performs an error display on the display that necessary preset components are not stored in the mixer engine 10 (S24). In this event, it is preferable to additionally display the names and IDs of absent components.

The above-described processing is performed, whereby when the components necessary for the operation are absent on the mixer engine 10 side, warning can be given to prompt the user to perform upgrade operation.

With the above, the description of the embodiment comes to the end, but the invention is not limited to the above-described embodiment. For example, it is adoptable to allow the PC 30 to individually store the data on the preset component which has been newly developed or improved. Besides, the configuration of data is not limited to that shown in FIG. 3 and FIG. 4, and a dedicated editing device or control device, rather than the PC 30, may be used as the editing device of the mixer system. As for the audio signal processing device, not limited to one but a plurality of devices may be simultaneously connected to the editing device. In this case, upgrade processing will be performed for each of the audio signal processing devices which the editing device has detected the start of connection therewith.

As has been described, with application of the component data managing method of the invention, the work of upgrading the data on components for signal processing both on the editing device side and on the audio signal processing device side in the audio signal processing system can be easily performed. Consequently, it is possible to provide an audio signal processing system requiring less labor in upgrading data.

What is claimed is:

1. A component data managing method of managing data on components for use in editing signal processing in an audio signal processing system comprising an editing device and a signal processing device, in the system
   a) the editing device edits, in accordance with a direction accepted on a graphical screen, contents of signal processing to be performed in an audio signal processing device, said contents of signal processing comprising: a plurality of components selected from a set of components, each of which indicates a signal processing function of performing predetermined processing on an inputted signal and outputting the processed signal realized by a signal processor executing a predetermined program in the signal processing device; and wires indicating function of inputting an output from one component to another component, b) the editing device causes the audio signal processing device to perform signal processing in accordance with the edited contents, c) the editing device stores, for each of the set of the components, first component data to be used in the edit of the contents of the signal processing using the graphical screen on the editing device, and second component data including a program for causing the signal processor provided in the audio signal processing device to realize the signal processing function corresponding to the component included in edited contents of the signal processing, and d) the audio signal processing device stores, for each of the set of the components, third component data including a program for causing the signal processor provided in the audio signal processing device to realize the signal processing function corresponding to the component included in edited contents of the signal processing, when the contents of the signal processing edited in the editing device is supplied to the audio signal processing device, said method comprising:

storing, by the editing device, the first component data for each of the set of the components with an identifier of the corresponding component;

storing, by the audio signal processing device, the third component data for each of the set of the components with an identifier of the corresponding component;

when detecting a direction to upgrade the third component data, comparing, by the editing device, the identifier attached to the first component data with the identifier attached to the third component data; and when detecting an identifier attached only to the first component data in said comparing step, transferring by the editing device, the second component data for the component associated with the detected identifier to the audio signal processing device and causing, by the editing device, the audio signal processing device to store the transferred second component data as the third component data.

2. The component data managing method of claim 1, further comprises:

storing, by the editing device, the first component data for each of the set of the components with version data of the corresponding component in addition to the identifier;

storing, by the audio signal processing device, the third component data for each of the set of the components with version data of the corresponding component in addition to the identifier;

comparing, by the editing device, the version data attached to the first component data with the version data attached to the third component data; and if the first component data and the third component data have a common identifier but different version data, transferring, by the editing device, the second component data for the component associated with the common identifier to the audio signal processing device and causing the audio signal processing device to store the transferred second component data as the third component data.

3. A component data managing method according to claim 1, further comprising:

storing, by the editing device, set-version data indicating a version of the first and second component data for the set of the components as a whole in the editing device;

storing, by the audio signal processing device, set-version data indicating a version of the third component data for the set of the components as a whole in the audio signal processing device;

comparing, by the editing device, the set-version data which the editing device and the audio signal processing device respectively stored; and when the version of the component data which the audio signal processing device stored is newer, stopping, by the editing device, control of the audio signal processing device and prompting a user to upgrade the component data which the editing device stored.

4. A component data managing method according to claim 2, further comprising:

storing, by the editing device, set-version data indicating a version of the first and second component data for the set of the components as a whole in the editing device stored;

storing, by the audio signal processing device, set-version data indicating a version of the third component data for the set of the components as a whole in the audio signal processing device; and comparing, by the editing device, the set-version data which the editing device and the audio signal processing device respectively stored; and when the version of the component data which the audio signal processing device stored is newer, stopping, by the editing device, control of the audio signal processing device and prompting a user to upgrade the component data which the editing device stored.

5. A component data managing method according to claim 1, wherein the first component data includes data on a name and appearance of the component displayed on the graphical screen.

6. A component data managing method according to claim 2, wherein the first component data includes data on a name and appearance of the component displayed on the graphical screen.

7. A component data managing method according to claim 1, wherein the second and third component data include composition data indicating a composition of parameters for use in the signal processing corresponding to the component.

8. A component data managing method according to claim 2, wherein the second and third component data include composition data indicating a composition of parameters for use in the signal processing corresponding to the component.

9. A component data managing method according to claim 1, wherein the editing device recognizes as being directed to upgrade the third component data when detecting start of connection with the audio signal processing device, when shifting to a state of performing online control on the audio signal processing device, or when being directed by a user to upgrade the third component data.

10. A component data managing method according to claim 2, wherein the editing device recognizes as being directed to upgrade the third component data when detecting start of connection with the audio signal processing device, when shifting to a state of performing online control on the audio signal processing device, or when being directed by a user to upgrade the third component data.

* * * * *